Sept. 19, 1972   M. B. E. FANT   3,692,536
FOOD PACKET
Filed Aug. 19, 1969   3 Sheets-Sheet 1
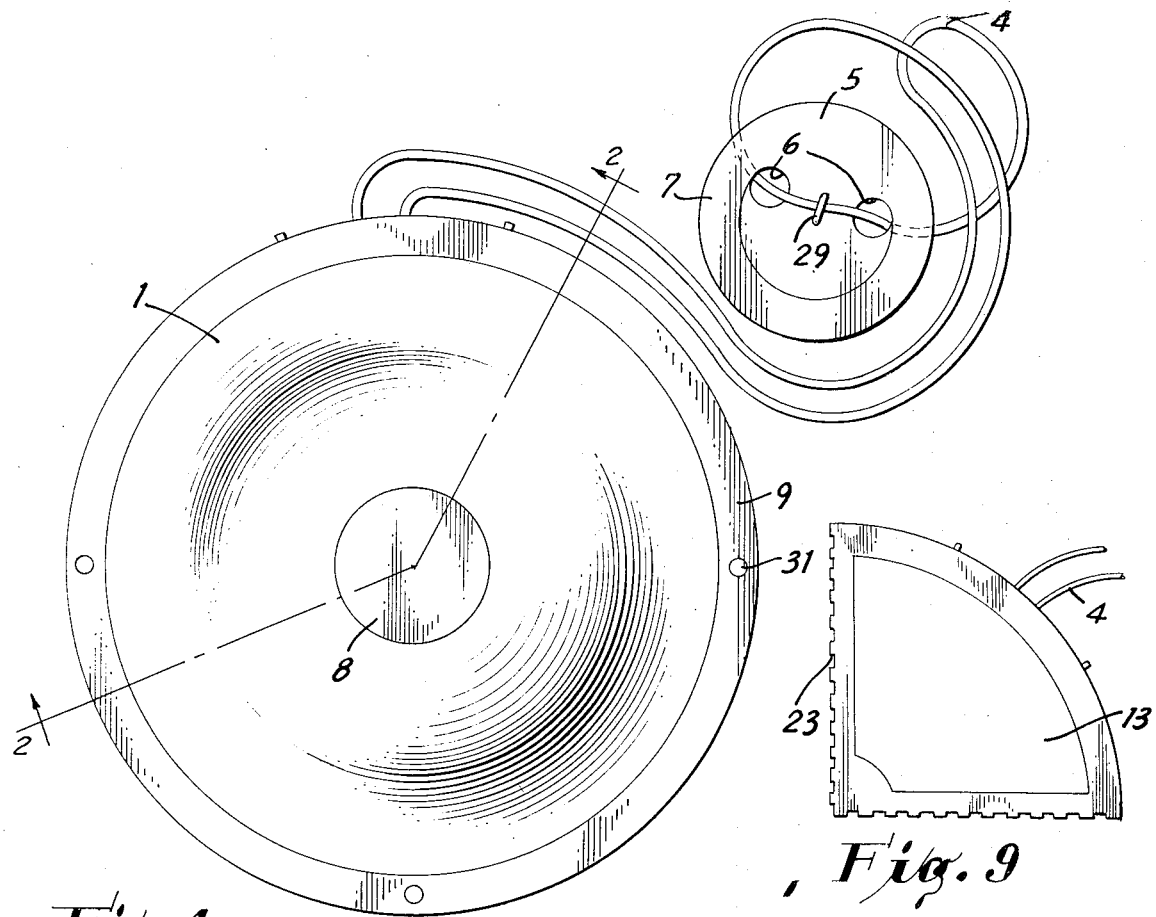
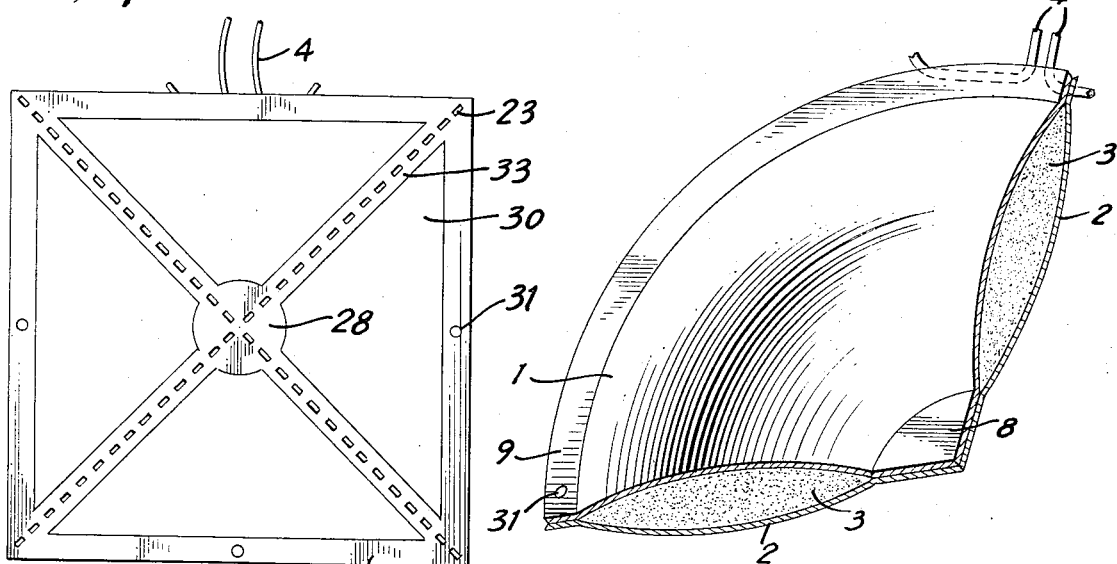

Sept. 19, 1972     M. B. E. FANT     3,692,536
FOOD PACKET
Filed Aug. 19, 1969     3 Sheets-Sheet 2
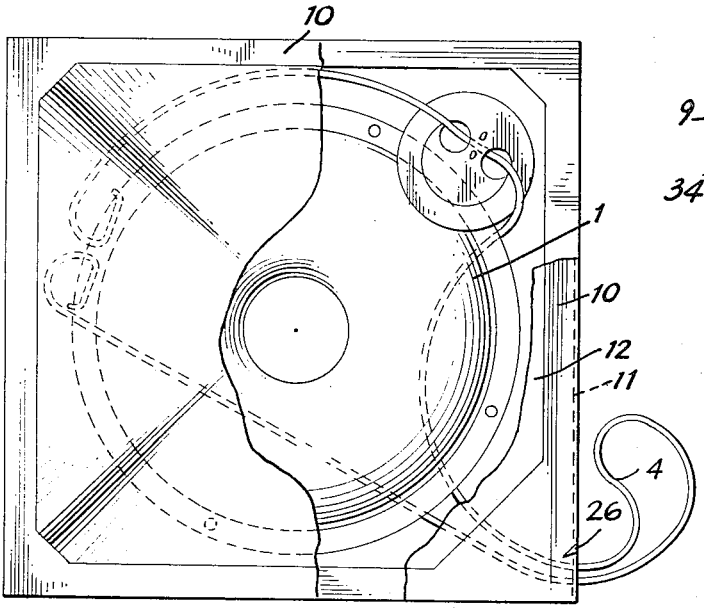
Fig. 3
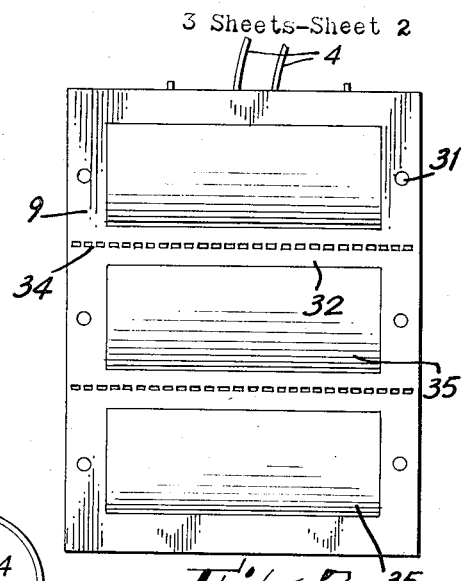
Fig. 7
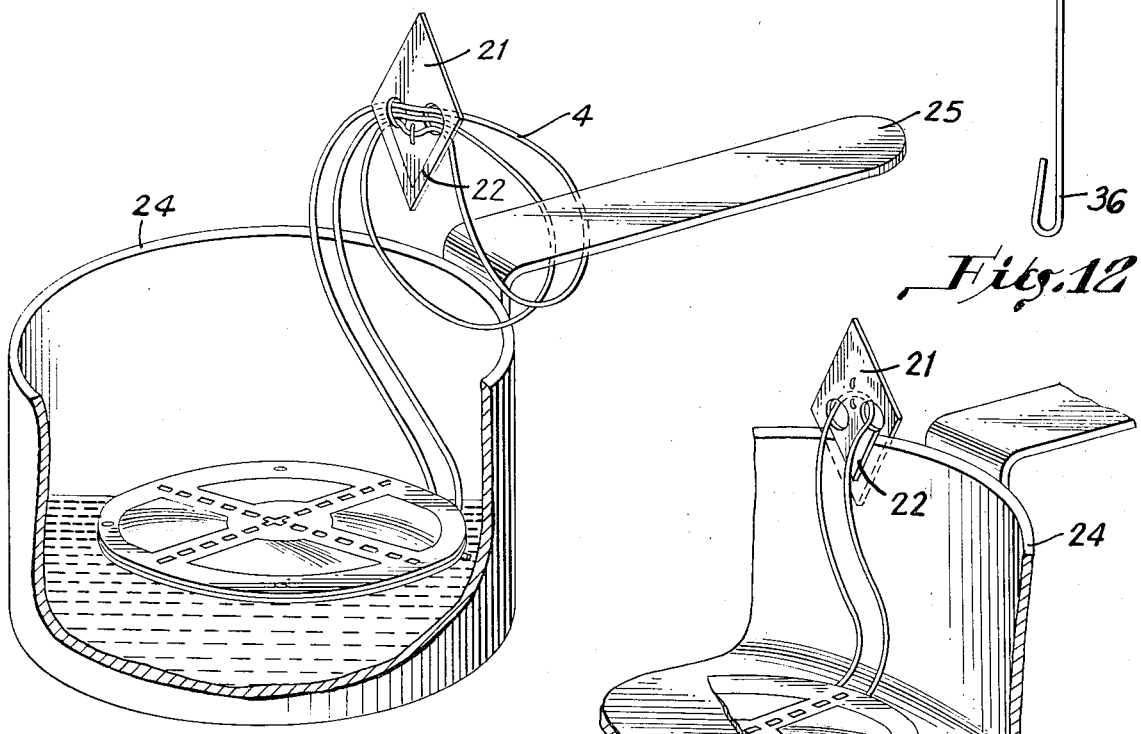
Fig. 10
Fig. 12
Fig. 11

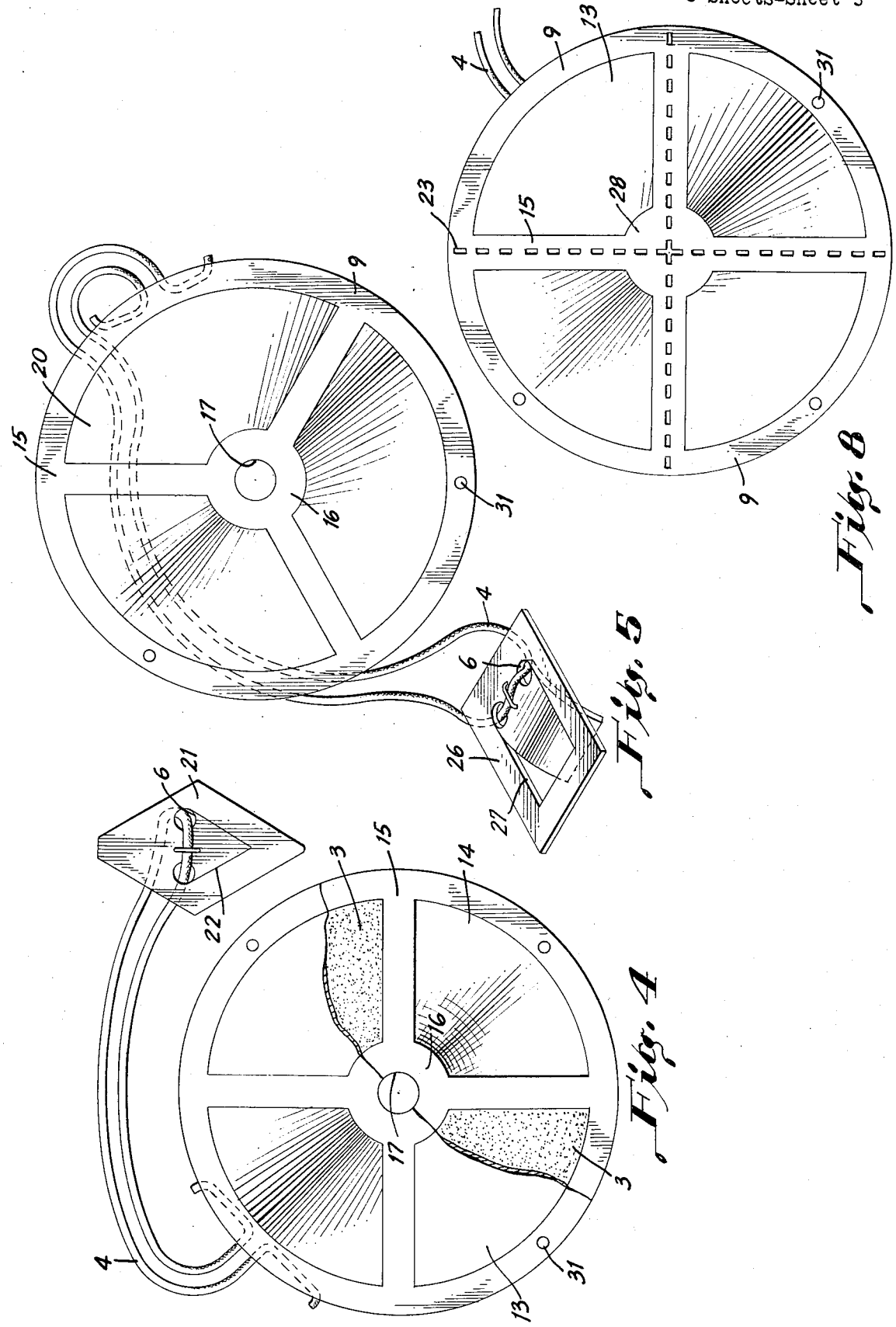

United States Patent Office 3,692,536
Patented Sept. 19, 1972

3,692,536
FOOD PACKET
Mae Belle Esco Fant, 214 McSwain Drive,
Greenville, S.C. 29607
Filed Aug. 19, 1969, Ser. No. 851,499
Int. Cl. B65b 29/04
U.S. Cl. 99—77.1    6 Claims

ABSTRACT OF THE DISCLOSURE

A food packet comprising a porous encasement having a void or voids therewithin filled with food particles to be used in flavoring foods and beverages and further provided with a string and a tag for anchoring said packet to a cooking container.

DESCRIPTION OF THE INVENTION AND THE DRAWINGS

The present invention relates generally to a food packet and more particularly to a novel packet to hold food particles such as coffee, tea, herbs or spices in preparing foods and beverages.

The improvements and advantages of the present invention will be clearly explained throughout the description. The present invention contemplates a sealed porous encasement with a void or voids, therewithin, to be filled with small particles of coffee, tea, herbs or spices in measured quantities, to be used in making better tasting and more appetizing foods or beverages.

It is the object of this invention to provide a porous encasement to evenly distribute the ingredients filled in the void or voids therewithin, which is an improvement over the existing food packets or bags on today's market.

Another object of this invention is to provide an encasement having the encasement made of a thin porous material which will allow the free flow of liquids to pass through the encasement.

It is still another object of the invention to have the particles of the ingredients within the void or voids prepared into a size to insure against the penetration of the food particles through the walls of the encasement.

There are many types of packets of foodstuffs on today's market which are used in the preparation of foodstuffs and beverages; however, most of these packets are made to package the food and are emptied of the contents when the ingredients are used for food or beverages. Very few of the packets are used directly in the cooking and seasoning and flavoring of foods and beverages. All of the packets of foodstuffs are packaged with the entire amount of ingredients in one mass inside of the encasement. Thus the present containers on today's market have a single void therewithin.

It can be pointed out that the foodpackets presently being used encase foodstuffs that are about the same size as they were when they were harvested. For instance tea leaves are packaged about the same size as they were after picking and drying. The brewing time for making a pot of tea with tea of this size takes a longer period of time to get a desired flavor. Some of the flavor is never utilized because of the size of some of the tea particles and because all of the tea leaves are in a single mass inside the packet, thus soaking the tea packet in hot water to make tea, one is unable to obtain all the flavor from the tea.

The encasements of the present invention are designed and the ingredients packed inside the void so as to utilize all the flavor and strength of the foodstuffs, which will enable one to use a smaller amount for the same desired flavor.

The ingredients packed in the present invention will be accurately measured, which will save time in measuring, and with the ingredients being of a finer consistency, time will be saved in cooking and brewing to get the desired flavor.

It can be noted that foodstuffs packaged in the present invention have not been further processed by dehydration or evaporation, and etc., than the processes used for the foods of a larger size and quantity. The foods will be of a finer consistency with no further processing necessary than is currently being done.

The uniqueness and novelty of the present invention is the distribution of the foodstuffs therewithin the void of the encasement. As shown in the drawings the packet has several separate sealed voids within the encasement, which are provided to be filled with portions of the measure. This distribution will insure full utilization of flavors from all of the measure, rather than have all of the measure in a single larger void where only part of the flavor is ever obtained. In abstracting the flavor from the core of a mass changes the flavor and sometimes most of the food value is lost from the outer surfaces of foodstuffs by longer cooking and brewing time.

This packet will be much cleaner to use, by not having to directly handle and measure the foodstuffs. It will also eliminate the inevitable spilling of bulk amounts, which is sometimes a whole can or bag of coffee, box of tea or a container of spices. It will eliminate used wet coffee grounds which have to be emptied, which in turn soils garbage containers, or can even clog drains, in their disposal.

An excellent use for these packets for the use of packaging coffee will be appreciated by having the coffee free of coffee bean particles and heavy sediment of the coffee particles passing through the holes in the coffee basket. The sediments that pass through the holes in the basket can become burned residue in the bottom of the coffee maker, which can ruin the true rich flavor of coffee beverages.

The design of the claimed packet is of a shape and size to fit the bottom of the coffee basket, thus, evenly distributes the coffee in the basket, and it also, provides means for the stem of the basket of the coffee pot to penetrate the packet.

To sum it up coffee can be made more quickly, using less coffee, resulting in a thinner better quality beverage, free of distasteful flavors from overcooked residue in the bottom of the coffee maker.

The packets are excellent for packaging tea. As with the method of packaging coffee, the tea will be of a finer consistency, and packed into several voids within the encasement. Because of the even distributing of the finely ground tea leaves less tea will be used and all of the flavor will be abstracted from the tea in less brewing time. These packets are an improvement over the tea packets or bags on today's market, because the tea is packaged about the same size of the natural growth, which has been dehydrated to a hard consistency and has to be brewed a longer period of time to abstract the flavors. The tea is also encased in the packets or bags in a single mass within the package, which some of the flavors are not abstracted.

Another use for the present invention is for packaging herbs and spices. A large portion of herbs and spices are preserved and sold in the original natural size and form. There are whole leaves, large pieces of pods and bark, whole seeds and roots, mixtures of various spices and herbs are used for flavoring foods and beverages. Most of the herbs and spices that are processed to be used in seasoning foods and beverages are very hard in nature, which makes food undesirable when some is chewed along with the food and in drinking beverages.

All herbs and spices are far too potent to be eaten, but are very excellent in flavoring foods. As stated these packets contain an exact measure, however, there are means provided to divide the packet when being used for herbs and spices to flavor foods to please the individual taste. The advantage of having herbs and spices packed in this packet is the convenience of removing the herbs and spices when a desired flavor is obtained, thus, not having to eat the seasonings and the foods will not be overly seasoned.

There are many other foods and seasonings that can be packaged in this claimed designed packet, other than these cited examples.

Directing attention to the drawing examples with further descriptions of the food packet are as follows:

FIG. 1 is a view showing a disc shaped food packet, string and tag.

FIG. 2 is a sectional view taken along line 2—2 of FIG. 1.

FIG. 3 is a cut-away view showing a disc shaped food packet string and tag within a wrapper.

FIG. 4 is a cut-away view of a segmented disc shaped food packet, string and diamond shaped tag.

FIG. 5 is a view showing a segmented disc shaped food packet, string and rectangular tag.

FIG. 6 is a view showing a segmented, divisible rectangular food packet.

FIG. 7 is a view showing another embodiment of a segmented, divisible rectangular food packet.

FIG. 8 is a view showing a segmented, divisible disc shaped food packet.

FIG. 9 is a view showing a sealed segment of the food packet shown in FIG. 8.

FIG. 10 is a cut-away view of a cooking container showing a disc shaped food packet therein with a diamond shaped tag looped around the handle thereof.

FIG. 11 is a fragmentary cut-away view of a cooking container showing a sealed segment of a food packet therein with a diamond shaped tag anchored to the wall thereof.

FIG. 12 shows a wire for use in conjunction with single sealed segments of the disclosed divisible food packets.

FIG. 1 shows a completely assembled and filled disc shape in design food packet. The food packet has a top 1 and a bottom 2, being sealed around the outer edges 9 and, sealed with a round seal 8 at the center point. The top 1 and the bottom 2 are made of a porous material, which will allow the free flow of liquids through the filled encasement to abstract the flavors of the food particles 3 packed in the encasement for flavoring and seasoning when cooking foods and beverages.

The string 4 is attached to the food packet to hold the food packet, or retrieve the food packet from cooked foods, when a desired flavor has been abstracted from the food particles inside of the food packet. The other end of the string 4 is attached to a round shape in design tag 5. The string is attached to the tag 5 with a staple 29. However, any means may be used for attaching the string to the tag.

The tag 5 has two punched holes 6, directly across from each other, on the inside of the outer edge of the tag. The tag has a slit 7 starting at the tangency point of the outside of each holes 6 and continuing inside of the outer edge of the tag to the tangency point of the outside of the other punched hole 6. The slit 7 can be punched outward from the tag 5 to secure the string to the cooking container by the anchoring action of the slit 7 of the tag 5.

FIG. 2 shows a half-section of FIG. 1, which shows an example of a food packet filled with food particles 3.

The wrapper 12 shown in FIG. 3 is made of any airtight material, such as foil, waxed paper, or a synthetic film, in sheet form. The wrapper 12 is a rectangular sheet folded and sealed along the outer edges 10. The fold edge 11 has a small slit 26 from the outer sealed edge 10. The food packet is sealed inside of the wrapper 12 for the preservation of the flavors of the food particles inside of the food packet. A portion of the string 4 is projected through the slit 26 for the purpose of pulling on the food packet to further slit the wrapper 12, so as to remove the food packet from the wrapper 12 for use.

The segmented food packets shown in FIGS. 4 and 5 are of a disc shape in design filled with a measured quantity of food particles 3, sealed in segments of the top 13 and the bottom 14 of FIG. 4. The encasement is sealed around the outer edges 9, and along the radii 15 of each segment to the round center seal 16 of the encasement. The round center seal 16 is perforated with a concentric hole 17. The concentric hole 17 is provided in food packets containing coffee for the convenience of placing the coffee packet over the water spout, which projects through the coffee basket in a coffee pot.

String 4 is attached to the food packet at one end and the other end is attached to tag 21. Tag 21 is of a diamond shape design, having two hole 6 punched across from each other inside of the outer edge. Slit 22 starts at the tangency point of the outside of one of the holes 6 and runs parallel to the outer edge of the tag 21 to the tangency point on the outside of the other hole 6. The methods of using the tag 21 is the same as described for tag 5 in FIG. 1.

FIG. 5 is shown in the drawings as another example of a segmented food packet, which illustrates how an exact measure can be divided into equal portions. It should be noted that the number of segments can vary to be adaptable to usage of the contents. The even distribution of the food particles to get the full flavors from all the ingredients packed inside of the packet is the improvement over the existing food packets on today's markets.

The tag 26 having a slit 27 is of a rectangular design, which is attached to string 4 and attached at the end to the food packet, However, this is just another shape the tag can be made, the novelty of all the designs of tags shown in the drawings are the punched holes and slits having the anchor action of holding the string to a cooking container.

A drawing illustration is shown of a rectangular shape in design food packet in FIG. 6. This shape is shown for a variation or choice of manufacturing, however, the principle of the even distribution of the food particles in segmented voids in the encasements is the same principle used in the disc shape designs. The packet is sealed around the outer edges 9 and at the center point with a round seal 28. It is sealed with a diagonal seal 33 through the packet from one corner to the opposite corner. The sealed diagonal seals 33 have small perforations 23 in the center of the seal 33 crossing at the center point seal 28. The perforation 23 are provided for the convenience of dividing the food packet when a smaller measure is desired.

Each segment 30 is provided with a perforation in the outer seal 9 for the convenience of attaching a wire to the perforation and attaching the other end of the wire 36 to a cooking container.

FIG. 7 is another example of a rectangular shape in design food packet showing the outer edges 9 sealed with segmented seals 32 from the outer edges through the food packet to the opposite outer edge 9. The segmented seals 32 are provided with perforations in the center of the seal 32 from one edge of the food packet to the opposite edge of the packet. The perforations are provided for the convenience of dividing the segments 35 when a smaller measure is desired.

FIG. 8 show a drawing illustration of a disc shape in design filled food packet, sealed around the outer edges 9, and along the radii 15 to the round center point seal 28. The sealed radii 15 has small perforations 23 for the convenience of easily dividing the food packet into smaller measures when less flavor from the food particles is desired.

FIG. 9 shows a filled sealed segment of a divided food packet.

In FIG. 10 of the drawings is an example of string 4 of the food packet anchored to the handle 25 of the cooking container 24, as described for the tag 5 in FIG. 1. The string 4 is looped around the handle 25 and is pulled through the slit 7 of tag 5 in FIG. 1, or for any of the other designs.

FIG. 11 is also a drawing example of how the string 4 can be anchored to a cooking container edge 24, by pressing the slit 22 in the tag 21 outward and clipping the tag 21 onto the edge 24 of the cooking container.

FIG. 12 shows a single piece of wire 36. Wire 36 is provided in all of the packages of food packets for the convenience of attaching the wire 36 to the perforations 31. A little portion of the wire 36 is inserted through the perforation 31 and is then pressed upward and touching the other portion of the wire. The other end of the wire 36 is pressed over the edge of the cooking container. This means is provided for the segments of all the designs of food packets when the food packet has been divided into segments, as a means for holding and retrieving the segment of food particles from a cooking container when a desired flavor has been abstracted from the food particles.

It should be noted that the exact composition, configuration, uses and structures in the present invention may vary or may be modified and would still be within the scope of the present invention, as claimed by the following claims.

I claim:

1. A food packet comprising an encasement, said encasement comprising:
   (a) top and bottom portions;
   (b) said portions being connected together at the outer edges to form a void therewithin;
   (c) said void being filled with a measure of food particles to be used in cooking foods and beverages, so as to abstract the flavor of the food particles inside the encasement for flavoring foods and beverages;
   (d) said portions being made of a porous material which will allow the free flow of liquids to pass through said encasement;
   (e) said encasement provided with string means for holding the encasement, said string means being attached to an anchor means;
   (f) said anchor means being a tag attached to said string means;
   (g) said tag being substantially diamond shaped in design, having means defining two holes on a horizontal line opposite each other on the inside of the outer edge of the tag and a land area therebetween, said tag having a slit starting on the outside of one hole at a tangency point thereof and continuing in a parallel line to the outside edge of the tag to a tangency point on the outside of the other hole;
   (h) said string means having first and second ends, said ends being attached to said encasement, said string means further defining a loop engaging said holes and means fastening said loop to said land area therebetween, whereby said anchor means will hold or fasten said string means to the rim of a container, or will securely hold said string means when looped around a handle for support.

2. A food packet in accordance with claim 1 wherein said encasement is of disc design, said portions being connected at the outer edges and at the center point of said portions with a round seal to form a single circular void therewithin.

3. A food packet in accordance with claim 1 wherein said encasement is of disc design, said portions being connected at the outer edges and at the center point of said portions with a round seal, said encasement being divided into sealed segments defining multiple sealed voids within said encasement, said segments having a seal of said portions from the radii point of the center seal along the radii of each segment to the outer edge seal of said encasement, said food particles being evenly distributed among said voids.

4. A food packet in accordance with claim 3 wherein said encasement is provided with small perforations along the center of said sealed radii of each segment, said perforations starting at the common radii point of said round center seal and continuing along the center of each sealed radii of each segment to the outer edge of said encasement, whereby said perforations converging to the common radii point of said encasement will provide an opening to accommodate the piercing of the stem of a coffee basket in a percolator and said perforations radiating from the radii of said center seal and along the radii of each sealed segment will permit division of said segments into two separate sealed portions.

5. A food packet in accordance with claim 1 wherein said encasement is of rectangular design, said portions being connected at the outer edges and at the center point of said portions with a round seal, said encasement being divided into sealed segments defining multiple sealed voids within said encasement, said segments having a seal of said portions along the diagonals thereof crossing at the center seal, said food particles being evenly distributed among said voids, said diagonal seals provided with small perforations along the center thereof, whereby said encasement may be divided into separate sealed portions.

6. A food packet in accordance with claim 1 wherein said encasement is of rectangular design, said portions being connected at the outer edges and having a plurality of parallel seals continuing through the encasement from one edge to the other defining multiple sealed voids within said encasement, said food being evenly distributed among said voids, said parallel seals having small perforations whereby said encasement may be divided into separate sealed portions.

References Cited

UNITED STATES PATENTS

| 2,786,761 | 3/1957 | Weisman | 99—171 P X |
| 3,175,911 | 3/1965 | Rambold | 99—77.1 |
| 3,373,677 | 3/1968 | Petrozzo | 99—77.1 X |
| 3,420,675 | 1/1969 | Costas | 99—77.1 |

FRANK W. LUTTER, Primary Examiner

W. L. MENTLIK, Assistant Examiner

U.S. Cl. X.R.

99—171 CP, 171 P